O. C. HARRELL.
VEHICLE SPRING.
APPLICATION FILED OCT. 18, 1916.
1,284,892.
Patented Nov. 12, 1918.
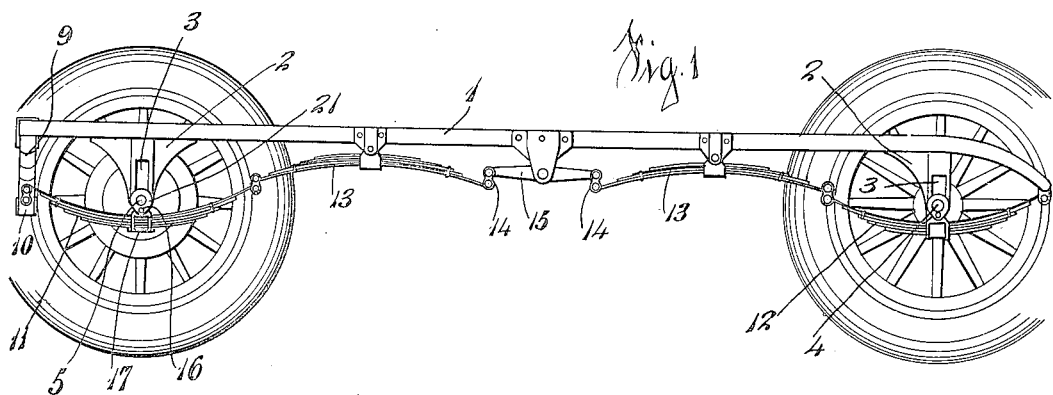
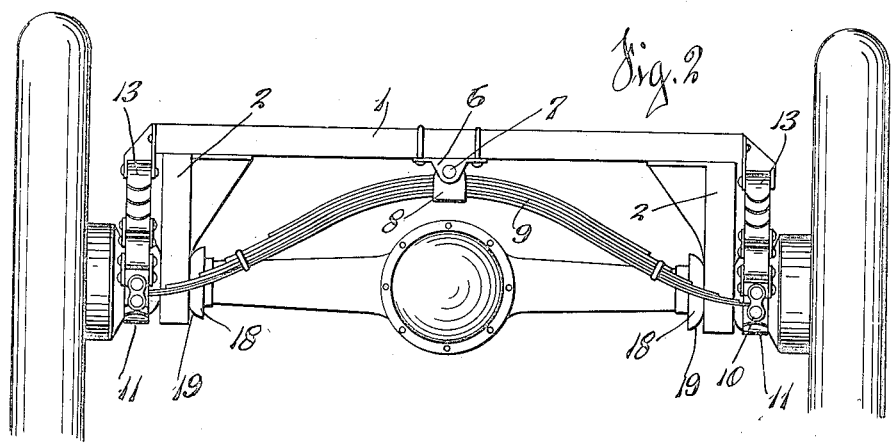
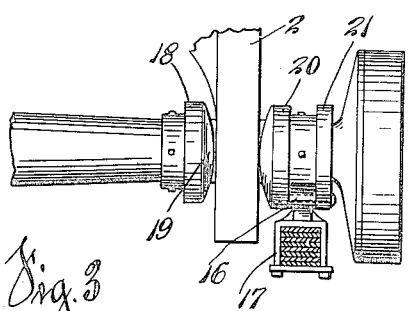
Inventor
Ora C. Harrell
by Allen & Allen
Attorneys

UNITED STATES PATENT OFFICE.

ORA C. HARRELL, OF CINCINNATI, OHIO, ASSIGNOR OF ONE-HALF TO HARRY J. MOLLOY, OF CINCINNATI, OHIO.

VEHICLE-SPRING.

1,284,892.

Specification of Letters Patent. Patented Nov. 12, 1918.

Application filed October 18, 1916. Serial No. 126,413.

*To all whom it may concern:*

Be it known that I, ORA C. HARRELL, a citizen of the United States, and a resident of the city of Cincinnati, in the county of Hamilton and State of Ohio, have invented certain new and useful Improvements in Vehicle-Springs, of which the following is a full, clear, and exact description, reference being had to the accompanying drawing, forming part of this description.

My invention relates to springs for vehicles, particularly motor vehicles. The great difficulty in the present type of springs is that with the comparatively light bodies that are supported and the great speed at which they travel and the roughness of the highways, the springs cannot be designed which will prevent the vehicle from a bouncing motion. Small jars or rattles in the heavier vehicles are fairly well taken up, but practically all pleasure cars are provided with shock absorbers to prevent the bounce up and down of the bodies on the springs or else to take care of the rebound only of the bodies on the springs.

The theory of the shock absorber is to cause the spring to move slowly at the points of greatest compression, and they thus serve to give to the body a slow motion which is not disagreeable.

The reason, as I have determined why the present type of springs cannot be made to fulfil their purpose, is that the various springs on a vehicle are separate units each taking care of a certain portion of the body, and thus no other of the springs can work against the ones under compression and thus relieve them of the shock suddenly imparted to them by unevenness of the road surface.

It is the object of my invention to provide springs for vehicles which are connected together and thereby act as a unit in the suspension of the car, and in any shock act together to relieve the stress from the particular point in the spring device where it occurs. Then again it is my object to do away with another objectionable feature of the present springs, which is that they are not mounted so as to permit of any tilting motion. My object is to so mount each spring that it will be free to tip at the middle, thereby preventing the lurching of the body owing to its being fast connected to the spring.

This latter feature also imparts considerable advantage to the entire spring suspension unit, as it assists the mutual co-action of the various springs.

While I have shown but one embodiment of my invention in the drawing, it will be understood that the number of springs and their exact relation to the body is not a requisite.

The object above stated and other advantages which will be indicated, I accomplish by that certain construction and arrangement of parts to be hereinafter more specifically pointed out and claimed.

In the drawing,

Figure 1 is a side elevation of my new spring device on the chassis of a vehicle.

Fig. 2 is a rear elevation thereof.

Fig. 3 is a detail elevation of the shafts at the point of passage through the hangers.

The vehicle has a frame 1, as shown in the drawing. Depending from this frame at the position where the wheels are to be set, are the brackets 2, 2. These have long slots 3 therein and the front and rear axles 4 and 5 respectively pass through these slots.

In the present embodiment, beginning at the rear of the car, there is mounted at the central part of the frame at the rear a clamp 6 which serves to mount pivotally at 7, a spring clip 8. The exact structure of the clamp and clip is not part of this invention, it being intended that any clamp or clip or device serving the function of pivotally mounting the spring be provided. The clip engages the rear spring 9 at the central portion and this spring extends to the sides of the car.

At the sides this spring is provided with a link 10, the upper knuckle of which is at right angles to the lower, and to this link is connected the side rear spring 11. The front spring structure is the same as the rear, and pivoted by means of suitable links to the front side spring 12 and the rear spring, are the springs 13, 13. These springs are pivotally mounted by like clamps and clips to the frame of the car, and at their adjacent ends are provided with links 14, 14, by which they are pivotally connected to the rock bar 15. This rock bar could be another spring if desired, and it is pivotally mounted to the frame in the same manner as the various springs, The front and rear axles, in the latter instance inclosed by the differential casing, which for convenience has been termed the rear axle, pass through the slots in the depending hangers or brackets above mentioned. Each axle at each end is provided with means to be described which pivotally supports at 16 a spring clip 17. These clips engage over the front and rear side springs at their central points.

From the above structure it can be appreciated that the vehicle is at no point fixedly secured to a spring, that the axles, incased or not, are free to move with relation to the vehicle body, that the entire spring structure forms a suspension unit, and will act together upon the shock or strain at any point.

Mounted on each axle at the inside of the slotted bracket or hanger, is a collar 18, which has a curved surface 19 opposed to the surface of the hanger. On the outside of the axles are collars 20 having like curved surfaces and provided with flanges 21, which serve together with the curved portions to mount the pivot pins 16 for the spring clips 17 above mentioned, thereby providing a pivotal mounting for the spring to the axles.

It will be understood that these collars with their curved surfaces are intended to illustrate any sort of bearing which will prevent the jamming of the axles in their slots, due to a tipping of the car. While these devices will be found effective, still the details of their construction are not of the essence of my invention.

Having thus described my invention, what I claim as new and desire to secure by Letters Patent, is:—

In an axle suspension for vehicles, comprising in combination with the frame of the vehicle, springs pivoted on three sides of the frame and pivoted to each other, slotted guides on the sides of the frame of the vehicle for the axle, contact blocks on the axle adapted to prevent lateral movement thereof while permitting the tipping thereof, and means for pivotally connecting the axle to the springs on the two opposite sides of the frame, as and for the purpose described.

ORA C. HARRELL.